US012643250B2

(12) United States Patent
Capelli et al.

(10) Patent No.: US 12,643,250 B2
(45) Date of Patent: Jun. 2, 2026

(54) STATUS MONITORING OF A CUTTING UNIT IN A FOOD PACKAGING APPARATUS

(71) Applicant: Tetra Laval Holdings & Finance S.A., Pully (CH)

(72) Inventors: Luca Capelli, Novellara (IT); Davide Borghi, Modena (IT); Daniel Sandberg, Lund (SE); Marco Cocconcelli, Reggio Emilia (IT); Achraf Lahrache, Montecchio Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 589 days.

(21) Appl. No.: 18/245,867

(22) PCT Filed: Sep. 20, 2021

(86) PCT No.: PCT/EP2021/075741
§ 371 (c)(1),
(2) Date: Mar. 17, 2023

(87) PCT Pub. No.: WO2022/063709
PCT Pub. Date: Mar. 31, 2022

(65) Prior Publication Data

US 2023/0356423 A1 Nov. 9, 2023

(30) Foreign Application Priority Data

Sep. 23, 2020 (EP) .................................... 20197663

(51) Int. Cl.
*B26D 5/04* (2006.01)
*B26D 5/00* (2006.01)
(Continued)

(52) U.S. Cl.
CPC ............... *B26D 5/04* (2013.01); *B26D 5/007* (2013.01); *B65B 9/2042* (2013.01); *B65B 51/144* (2013.01)

(58) Field of Classification Search
CPC ........ B26D 5/04; B26D 5/007; B65B 9/2042; B65B 51/144; G05B 19/4065
See application file for complete search history.

(56) References Cited

U.S. PATENT DOCUMENTS 3,809,870 A * 5/1974 Auble ..................... B23F 23/12 73/104
4,176,396 A * 11/1979 Howatt .................... G01N 3/58 73/104
(Continued)

FOREIGN PATENT DOCUMENTS

CN 101072709 A 11/2007
CN 106030427 A 10/2016
(Continued)

OTHER PUBLICATIONS

International Search Report and Written Opinion received in PCT Application No. PCT/EP2021/075741 as mailed Dec. 12, 2021 in 9 pages.

*Primary Examiner* — Veronica Martin
*Assistant Examiner* — Mobeen Ahmed
(74) *Attorney, Agent, or Firm* — Knobbe, Martens, Olson & Bear, LLP

(57) ABSTRACT

The status of a cutting unit (165*a*, 165*b*) in an apparatus for producing packages of liquid food is monitored based on a time sequence of measurement values from a sensor (30), e.g., a pressure transducer, which is arranged to measure cutting resistance for a cutting blade (166*a*, 166*b*) in the cutting unit when actuated to perform a cut to sever food-containing packages (106) from each other. The monitoring comprises generating a resistance time profile for the mea-
(Continued)

surement values, detecting at least one predefined feature in the resistance time profile, determining a respective phase value for the predefined feature(s), and determining the status of the cutting unit (165*a,* 165*b*) as a function of a set of input values comprising the respective phase value. The status may represent the degree of wear of the cutting blade (166*a,* 166*b*).

17 Claims, 6 Drawing Sheets

(51) Int. Cl.
*B65B 9/20* (2012.01)
*B65B 51/14* (2006.01)

(56) References Cited

U.S. PATENT DOCUMENTS 4,207,567 A * 6/1980 Juengel .............. G05B 19/4065 73/104
4,442,494 A * 4/1984 Fromson ............ G05B 19/4065 73/104
4,551,808 A * 11/1985 Smith ................ B23Q 17/0947 318/565
4,786,220 A * 11/1988 Fildes ................ G05B 19/4065 409/134
4,802,274 A * 2/1989 Petrof ................ B23Q 17/0961 408/11
5,243,533 A * 9/1993 Takagi ............... G05B 19/4065 318/565
5,822,212 A * 10/1998 Tanaka ............... G05B 19/4063 700/87
5,857,166 A * 1/1999 Kim ................... G05B 19/4065 702/179
5,921,726 A * 7/1999 Shiozaki .................. B23Q 1/70 408/6
6,044,628 A * 4/2000 Katayama ......... B29C 66/72328 53/552
6,937,942 B2 * 8/2005 Lee .................... B23Q 17/0957 702/33
7,484,341 B2 * 2/2009 Konno .................. B29C 66/723 53/551
10,800,063 B2 * 10/2020 Larsson-Hall ........... B26D 5/12
12,050,450 B2 * 7/2024 Yamamoto ......... G05B 19/4063
12,332,112 B2 * 6/2025 Fukuda .............. G05B 19/4065
2007/0107376 A1 * 5/2007 Konno ..................... B26D 1/08 53/552
2021/0252728 A1 * 8/2021 Montagnani ........... B26D 1/405
2022/0001569 A1 * 1/2022 Norgia ................. B27G 19/003
2023/0065699 A1 * 3/2023 Ozeki ...................... B23H 7/20
2024/0241499 A1 * 7/2024 Hammann ......... G05B 19/4065
2025/0153297 A1 * 5/2025 Shibata .................. B23Q 17/09

FOREIGN PATENT DOCUMENTS

| | | | |
|---|---|---|---|
| CN | 106184936 | A | 12/2016 |
| EP | 1666362 | A1 | 6/2006 |
| EP | 3366819 | A1 | 8/2018 |
| JP | 2007/061985 | | 3/2007 |
| WO | WO 2017/102864 | A1 | 6/2017 |

* cited by examiner

STATUS MONITORING OF A CUTTING UNIT IN A FOOD PACKAGING APPARATUS

TECHNICAL FIELD

The present disclosure generally relates to food packaging machines for producing packages of liquid food, and in particular to status monitoring of cutting units in food packaging machines.

BACKGROUND ART

Industrial production and packaging of liquid food is automated and involves advanced process control of food packaging machines to achieve high-volume production. Safe and reliable operation of the food packaging machines is of great significance since operational failures and ensuing production standstills may have a profound impact on production cost and product quality. Early detection of operational failures is critical in avoiding performance degradation and damage to the machinery or human life.

A food packaging machine normally includes a cutting unit with one or more knifes for cutting package material while generating the packages containing the liquid food. The knives will be worn down over time and need to be replaced. Conventionally, the knives are regularly replaced based on running hours. However, this may cause a knife to be replaced too early, leading to unnecessary standstill of production, or too late, leading to potentially large volumes of packages that need to be discarded for lack of sufficient quality.

The prior art comprises EP1666362 which proposes to measure the cutting resistance of the knife by a pressure sensor and monitor the condition of the cutting blade by determining a pressure difference between a maximum resistance pressure during a cutting step and a constant resistance pressure following the maximum resistance pressure, and comparing the pressure difference to a reference value.

WO2017/102864 similarly proposes to detect the pressure in a hydraulic system for actuating a cutting blade. A need for replacement of the cutting blade is indicated when the detected pressure as the cutting blade cuts through the packaging material exceeds a predetermined threshold.

While these proposed techniques may be useful in detecting a need for replacement of the knife or cutting blade in a well-controlled test environment, they may lack sufficient reliability to be installed in an actual production environment. They are also unable to identify additional fault conditions that may occur in cutting units.

SUMMARY

It is an objective to at least partly overcome one or more limitations of the prior art.

One objective is to provide an alternative technique for monitoring the status of a cutting unit in a packaging machine for liquid food.

A further objective is to provide such a technique that enables high reliability in a production environment.

One or more of these objectives, as well as further objectives that may appear from the description below, are at least partly achieved by a method of monitoring a status of a cutting blade, a computer-readable medium, a monitoring device, and an apparatus for producing packages of liquid food according to the independent claims, embodiments thereof being defined by the dependent claims.

A first aspect of the present disclosure is a method of monitoring a status of a cutting unit in an apparatus for producing packages of liquid food. The apparatus comprises the cutting unit and is configured to vertically seal a web of packaging material in the form of a tube, fill the tube with liquid food, form transverse seals in the tube, and cut the transverse seals by a cutting blade in the cutting unit to sever food-containing packages from each other. The method comprises: obtaining a time sequence of measurement values from a sensor arranged to measure cutting resistance for the cutting blade when actuated to cut a respective transverse seal; processing the time sequence of measurement values to generate a resistance time profile; detecting at least one predefined feature in the resistance time profile; determining a respective phase value for the at least one predefined feature within the resistance time profile; and determining the status of the cutting unit as a function of a set of input values comprising the respective phase value.

The first aspect is based on the finding, after extensive experimentation, that the phase ("timing") of features in the resistance time profile is responsive to the status of the cutting unit, including the degree of wear of the cutting blade. The first aspect thereby provides an alternative technique for monitoring the status of the cutting unit in an operating packaging machine. The insight that phase may be used for determining the status of the cutting unit opens up the possibility to determine the status based on phase value(s) in combination with further input values, which may represent the resistance time profile by other evaluation parameters than phase, such as magnitude, temporal change or variability, to further improve the robustness of the monitoring and thereby enable high reliability in a production environment. The use of phase further opens up the possibility to detect additional fault conditions of the cutting unit, such as incorrect cutting performance or timing, or increased friction within the cutting unit.

A second aspect of the present disclosure is a computer-readable medium comprising computer instructions which, when executed by a processor, cause the processor to perform the method of the first aspect or any embodiment thereof.

A third aspect of the present disclosure is a monitoring device. The monitoring device comprises a signal interface for connection to a sensor which is arranged to measure and output a time sequence of measurement values that represent cutting resistance for a cutting blade in an apparatus for producing packages of liquid food while the cutting blade is actuated to cut a respective seal formed in a tube filled with liquid food, and logic configured to control the monitoring device to perform the method of the first aspect or any embodiment thereof.

A fourth aspect of the present disclosure is an apparatus for producing packages of liquid food. The apparatus comprises a cutting unit and is configured to vertically seal a web of packaging material in the form of a tube, fill the tube with liquid food, form transverse seals in the tube, and cut the transverse seals with a cutting blade in the cutting unit to sever food-containing packages from each other. The apparatus further comprises: a sensor which is arranged to measure and output a time sequence of measurement values that represent cutting resistance for the cutting blade when actuated to cut a respective transverse seal, and a monitoring device of the third aspect or any embodiment thereof.

Still other objectives, embodiments, features, and aspects as well as technical effects of the subject of the present disclosure will appear from the following detailed description as well as from the drawings.

BRIEF DESCRIPTION OF THE DRAWINGS

Embodiments will now be described, by way of example, with reference to the accompanying schematic drawings.

DETAILED DESCRIPTION

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. As used herein, the term "and/or" comprises any and all combinations of one or more of the associated listed elements. As used herein, the term a "set" of elements is intended to imply a provision of one or more elements.

As used herein, "liquid food" refers to any food product that is non-solid, semi-liquid or pourable at room temperature, including beverages, such as fruit juices, wines, beers, sodas, as well as dairy products, sauces, oils, creams, custards, soups, pastes, etc., and also solid food products in a liquid, such as beans, fruits, tomatoes, stews, etc.

As used herein, "a package" refers to any package or container suitable for sealed containment of liquid food products, including but not limited to containers formed of cardboard or packaging laminate, e.g. cellulose-based material, and containers made of or comprising plastic material.

Like reference signs refer to like elements throughout.

Figure 1A:
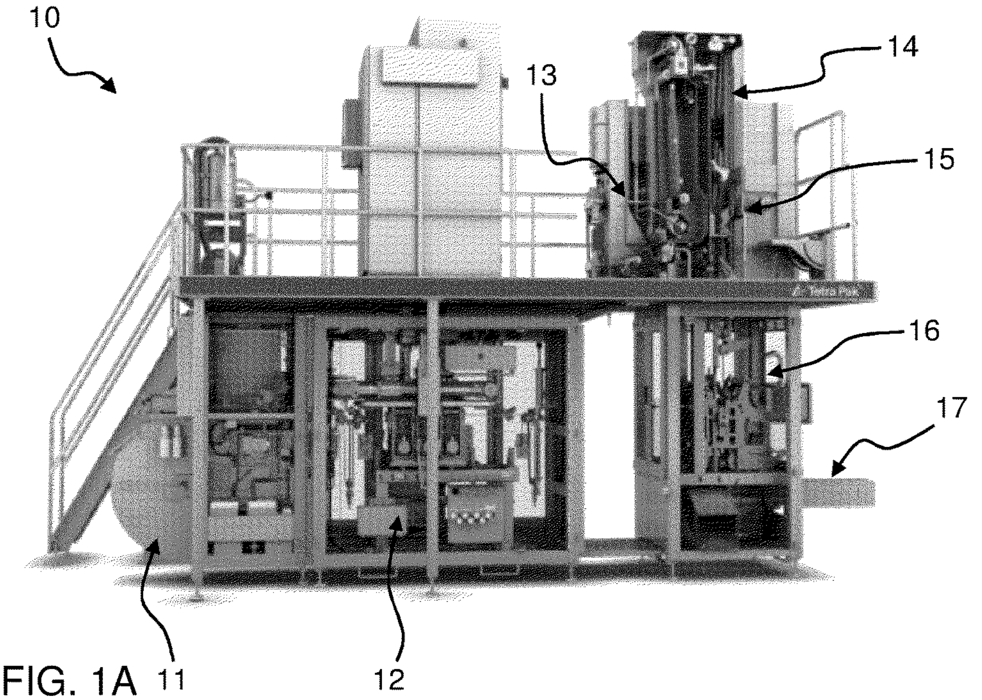
FIG. 1A is a side view of a roll-fed carton packaging machine in accordance with an example.

FIG. 1A is a side view of a machine or apparatus 10 for packaging of liquid food. The machine 10 is an example of a roll-fed carton based packaging system. In the illustrated example, the machine 10 comprises an in-feed section 11, which holds one or more reels of carton-based sheet material, a micro injection molding section 12 for application of a molded opening device to the sheet material, a bath section 13 for sterilizing the sheet material, a sterile chamber 14, a tube forming section 15 for forming the sheet material into a tube, a filling section 16 for filling, sealing and cutting the tube-shaped material, and an outfeed section 17 for outputting packages.

Figure 1B:
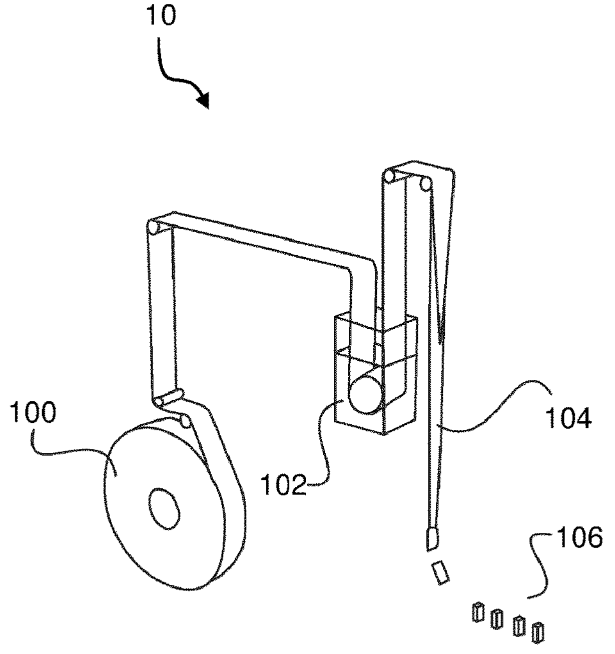
FIG. 1B illustrates in perspective view a flow of material through the packaging machine of FIG. 1A.

FIG. 1B generally illustrates an operating principle of the machine 10 in FIG. 1A, which may be deployed for continuous packaging of liquid food products. Packaging material is delivered in reels 100 of sheet material to the plant where the packaging machine is installed. The machine 10 unwinds and feeds the packaging material into a bath 102, for example containing hydrogen peroxide, in order to sterilize the packaging material. Alternatively, the sterilization may be performed by use of low-voltage electron beam (LVEB) technology. After sterilization, the packaging material is formed into a tube 104. More particularly, longitudinal ends are attached to each other continuously in a process often referred to as longitudinal sealing. When having formed the tube 104, the machine fills it with a liquid food product. The machine forms packages 106 from the food-containing tube 104 by making transversal seals in an end of the tube 104 and cutting off sealed portions as they are formed. The machine may perform different shaping operations during and/or after the transversal sealing in order to shape the packages 106.

Figure 1C:
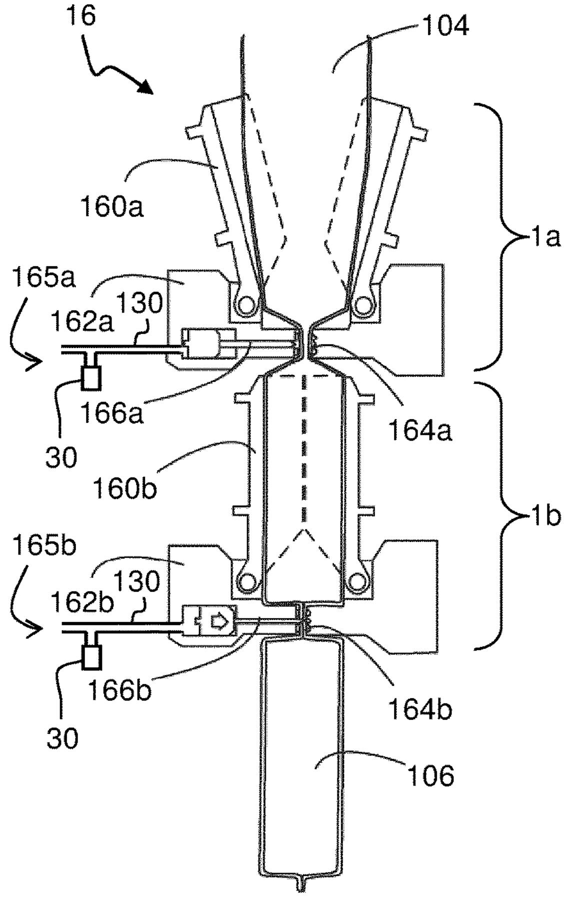
FIG. 1C is a side view of an example sealing mechanism in the packaging machine of FIG. 1A.

The filling section 16 of the machine 10 is illustrated in more detail in FIG. 1C by way of example. In order to produce the packages 106 from the tube 104, forming flaps 160*a*, 160*b* in combination with sealing jaws 162*a*, 162*b* may be used. Each sealing jaw 162*a*, 162*b* comprises a sealing device 164*a*, 164*b* and a cutting unit 165*a*, 165*b* with a knife 166*a*, 166*b*, also denoted "cutting blade" herein, for separating a formed package from the tube 104. Each combination of a forming flap 160*a*, 160*b* and a sealing jaw 162*a*, 162*b* defines a respective mechanical unit 1*a*, 1*b*, which is moved along with the tube. FIG. 1C illustrates a first and a second stage of the package-forming process. In the first stage, the forming flaps 160*a* are starting to form the tube into a shape of the package and the tube is filled with the liquid food product, e.g. via a pipe (not shown) extending into the tube. Also in the first stage, the sealing jaws 162*a* are operated to form a transversal seal by use of the sealing device 164*a*. In the second stage, the forming flaps 160*b* are held in position such that the package shape is formed. Also in the second stage, the sealing jaws 162*b* are operated to form a transversal seal using the sealing device 164*b*. When the transversal seal is completed, the knife 166*b* is operated to cut off a lower part of the tube 104, in which both ends are closed by transversal seals.

In the following, embodiments of a technique for monitoring the status of the cutting units in a packaging machine will be described with reference to the example machine 10 in FIGS. 1A-1C. In some embodiments, the purpose of the monitoring is to identify and signal a need to replace the respective knife when it is no longer deemed sufficiently sharp. In these embodiments, the status of the cutting unit thus designates the condition of the knife, for example in terms of its degree of wear. In other embodiments, the status of the cutting unit may designate if the seal is properly cut through by the cutting unit, if the cutting unit performs the cut with a proper timing, or if the knife is subjected to increased mechanical friction on its travel path. In another embodiment, the status may generally indicate if the cutting unit is operating properly or not.

The monitoring operates on a sensor signal ("measurement signal") from a sensor 30 (FIG. 1C) associated with the respective knife 166*a*, 166*b*. The sensor 30 is arranged to measure the cutting resistance exerted on the knife 166*a*, 166*b* when the knife 166*a*, 166*b* is operated to cut one of the transverse seals. In some embodiments, the sensor 30 is directly or indirectly attached to the knife 166*a*, 166*b* and comprises an accelerometer, a vibration sensor, a torque sensor, a strain gauge, or a thin-film force sensor. In the embodiments presented in more detail below, the sensor 30 is a pressure sensor, also known as pressure transducer, which is arranged to measure the hydraulic pressure in a hydraulic circuit 130 that is operated by the machine 10 to actuate the respective knife 166*a*, 166*b* to perform a cutting operation through a transverse seal. It is currently believed that the use of such a pressure sensor 30 facilitates robust monitoring.

Figure 2A:
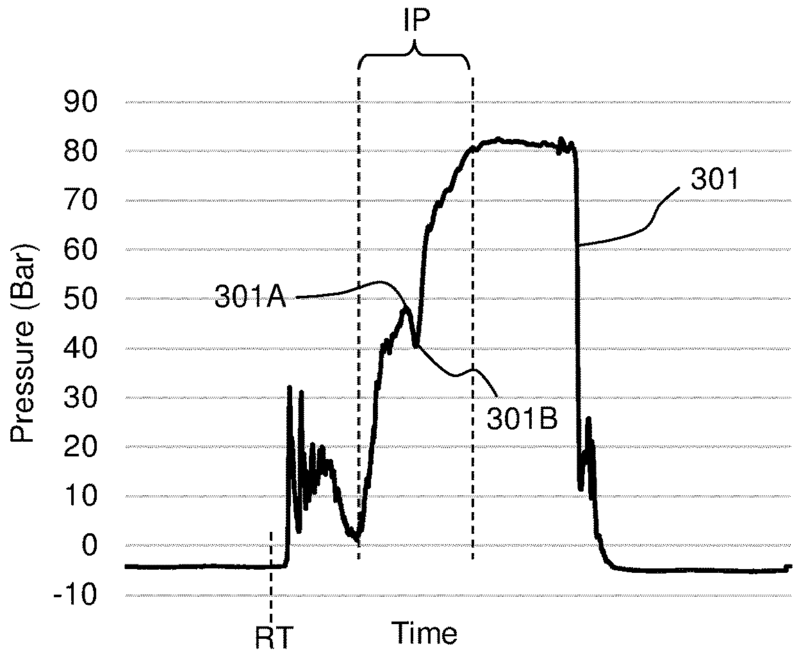
FIGS. 2A-2B are graphs of example resistance time profiles for a sharp cutting blade and a worn cutting blade, respectively, as measured by a pressure sensor in the sealing mechanism shown in FIG. 1C.
Figure 2B:
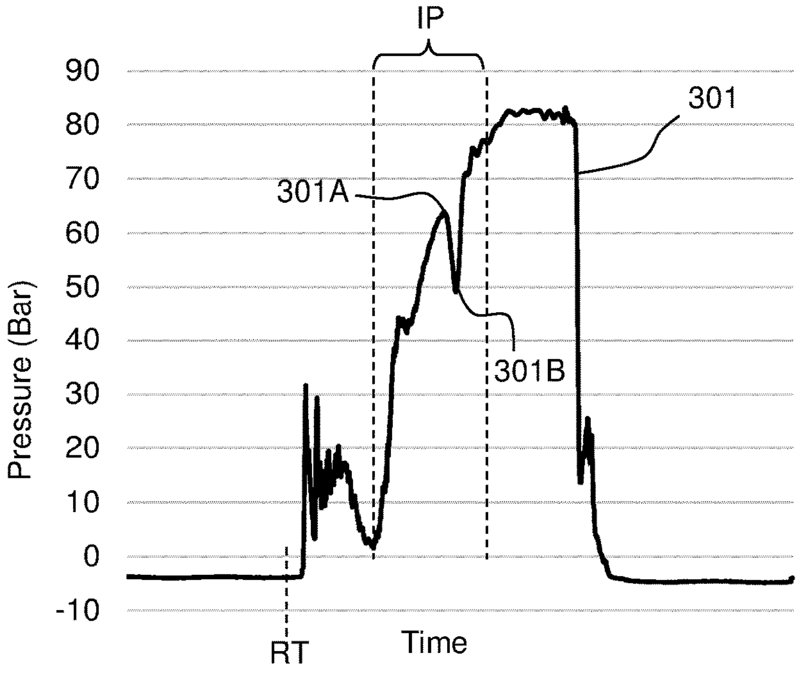

FIG. 2A shows, by way of example, a time profile 301 of cutting resistance for a sharp cutting blade as measured by one of the pressure sensors 30 in FIG. 1C. FIG. 2B shows, also by way of example, a corresponding time profile 301 for a worn cutting blade. As seen from these representative time profiles, the increased wear of the cutting blade has a profound impact on the time profile 301, in particular during an intermediate portion IP of the time profile 301. The intermediate portion IP, which is approximately indicated in FIGS. 2A-2B, exhibits a steep increase in pressure (cutting resistance) up to an intermediate first (positive) peak 301A, which is followed by a drop in pressure until a second intermediate (negative) peak 301B, where pressure again rises sharply. The first and second peaks 301A, 301B have been found to correspond to the knife 166*a*, 166*b* penetrating into the transverse seal, with the first peak 301A occurring just as the knife enters the seal, i.e. when cutting of the seal is beginning. The second peak 301B is believed to be caused by a return of elastic energy occurring after the knife has fully penetrated the seal, i.e. when the seal is being cut through.

The most conspicuous change of the time profiles from FIG. 2A to FIG. 2B is that the magnitude of the intermediate portion IP is increased. This may be least partly caused by a need for an increased cutting force as the sharpness of the knife decreases.

After detailed analysis of a vast number of time profiles for packaging machines 10 operating at different settings and conditions, it has been found that there is also a statistically significant change in the timing of various features in the intermediate portion IP, for example the peaks 301A, 301B. The timing is also denoted "phase" herein and is the time of occurrence of the respective feature in relation to a known reference time point, for example the generation of a trigger signal to the hydraulic system for operating the respective knife 166*a*, 166*b*, schematically indicated at RT in FIGS. 2A-2B. After substantial experimentation, the present Applicant has found that the phase of one or more features in the intermediate portion IP of the time profile 301 is indeed useful for robust and reliable determination of the status of the cutting unit 165*a*, 165*b*. For example, the phase of features in the profile 301 has been found to increase with increasing wear of the cutting blade. This may be at least partly attributed to an increased travel distance of the cutting blade as it is worn down and/or a longer time being required for a blunter cutting blade to cut into and through the seal. Further, it is understood that the phase of features in the profile 30, including but not limited to the peaks 301A, 301B, will change with the timing of the cutting operation, and that the phase thus is useful for determining if the cutting unit performs the cut with a proper timing. Likewise, it is understood that the phase of features in the profile 30, including but not limited to the peaks 301A, 301B, will change with the amount of mechanical friction that the knife is subjected to on its travel path. It should also be realized that an incomplete cut of the seal will show up as a change of phase of one or more features in the profile 301. Irrespective of the type of status to be determined, an improved robustness of the monitoring may be achieved by analyzing the phase in combination with one or more other evaluation parameters to be described further below.

In the following, example embodiments for detection of the condition of the cutting blade in terms of wear will be presented with reference to FIGS. 3-6.

Figure 3A:
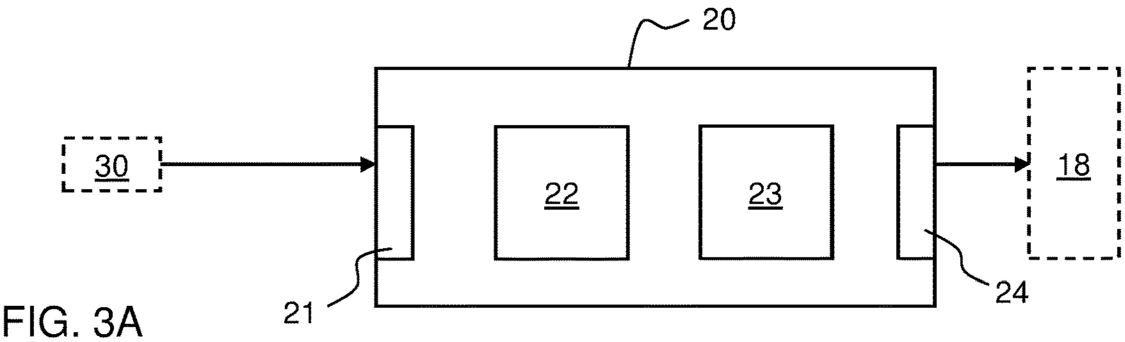
FIGS. 3A-3C are block diagrams of example monitoring devices in accordance with some embodiments.

FIG. 3A illustrates an example monitoring device 20 which comprises a first signal interface 21 configured for connection, by wire or wirelessly, to the sensor 30 for measuring cutting resistance. In the illustrated embodiment, the monitoring device 20 is implemented on a software-controlled computing device, which comprises a processor 22 and computer memory 23. The processor 22 may, e.g., include one or more of a CPU ("Central Processing Unit"), a DSP ("Digital Signal Processor"), a microprocessor, a microcontroller, a GPU ("Graphics Processing Unit"), an ASIC ("Application-Specific Integrated Circuit"), a combination of discrete analog and/or digital components, or some other programmable logical device, such as an FPGA ("Field Programmable Gate Array"). A control program comprising computer instructions may be stored in the memory 23 and executed by the processor 22 to perform any monitoring method as described or implied herein. The control program may be supplied to the monitoring device 20 on a computer-readable medium, which may be a tangible (non-transitory) product (e.g. magnetic medium, optical disk, read-only memory, flash memory, etc.) or a propagating signal. The monitoring device 20 further comprises a second signal interface 24, which may provide output data to a module 18 of the machine 10, by wire or wirelessly. The output data may cause the module 18 to display the monitoring result to an operator of the machine 10, generate an indicator signal to alert the operator of a current or incipient fault condition of a cutting unit in the machine 10, store the monitoring result in a data log, etc. The module 18 may also comprise a control device of the machine 10 and be operable to command a stop of the machine 10 when an imminent need for service or maintenance of the cutting unit is detected. In some embodiments, the monitoring device 20 is a physical device located at or near the machine 10. In other embodiments, the monitoring device 20 is implemented by a remote server, for example by cloud computing.

An example method of monitoring the condition of a knife or cutting blade in a packaging machine will be described with reference to the flow chart in FIG. 4 and may be performed by monitoring device 20 in FIG. 2A in relation to the machine 10 in FIGS. 1A-1C.

Figure 4:
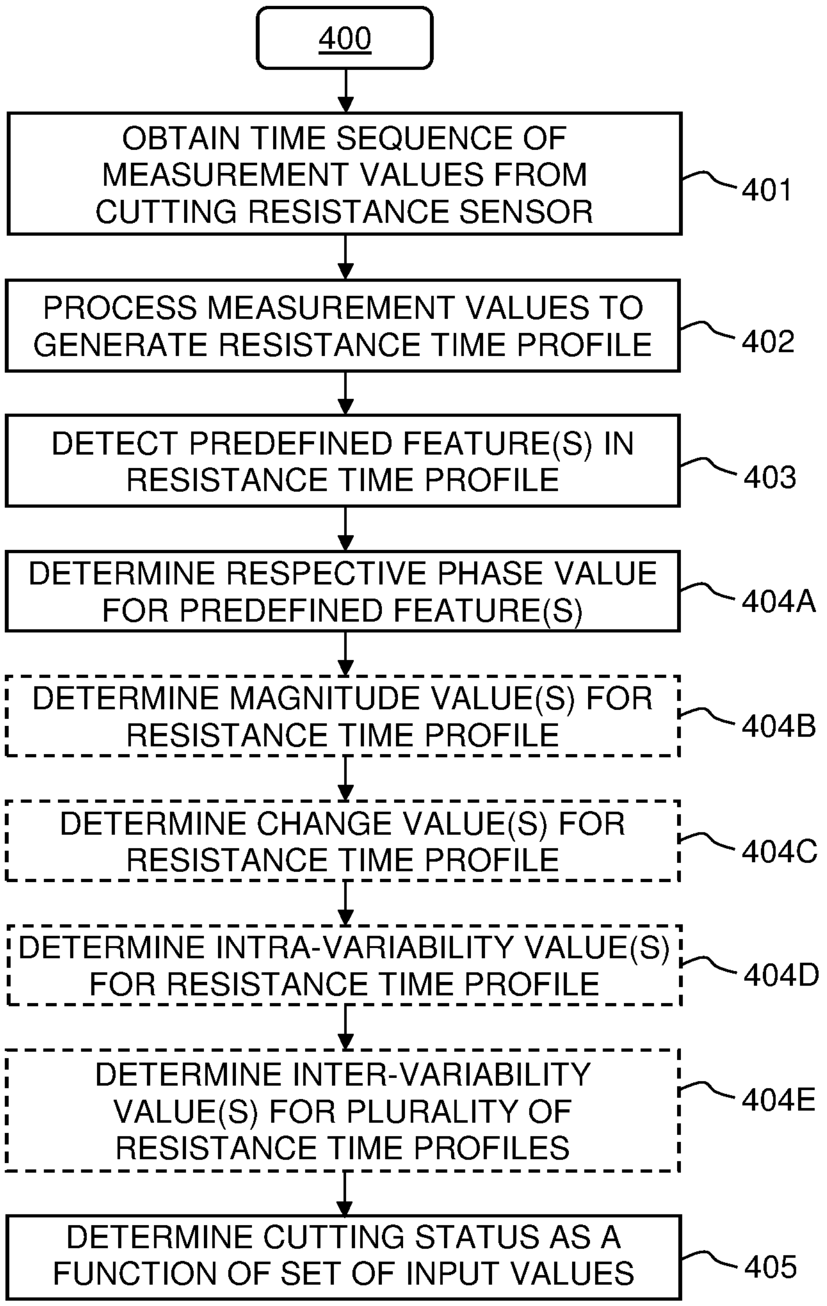
FIG. 4 is a flowchart of an example method for monitoring the condition of a cutting blade in a packaging machine in accordance with some embodiments.

In the example of FIG. 4, step 401 obtains a time sequence of measurement values from the sensor 30.

Step 402 processes the time sequence of measurement values to generate a resistance time profile, for example as exemplified in FIGS. 2A-2B. The resistance time profile represents the force applied to the cutting blade while it is actuated to cut through a seal, also denoted a "cutting cycle" herein. Step 402 may, e.g., comprise one or more of data sampling, A/D conversion, baseline correction, time synchronization in relation to the reference time (cf. RT in FIGS. 2A-2B), averaging, etc. The time synchronization may be performed to associate the respective measurement value with a time point in relation to the reference time point. The averaging may comprise time-aligning and averaging measurement values for a plurality of consecutive cutting cycles to thereby form an average time profile. The averaging may improve the robustness of the monitoring.

Step 403 processes the resistance time profile generated by step 402 for detection or identification of at least one predefined feature. Various examples of the predefined feature are presented further below with reference to FIGS. 5A-5C.

Step 404A determines a phase value for each predefined feature within the resistance time profile.

Step 405 determines the condition of the cutting blade as a function of a set of input values comprising the phase value(s). In some embodiments, step 405 may comprise comparing the input value(s) to a corresponding threshold value to determine the condition. The condition may be determined among at least two different condition designations, for example "acceptable" and "unacceptable". Additional condition designations may indicate an upcoming but not immediate need for replacement. In some embodiments, step 405 may generate a condition value indicative of the quality of the cutting blade, for example on a continuous or discrete scale, for example from 1 to 10.

Figure 5A:
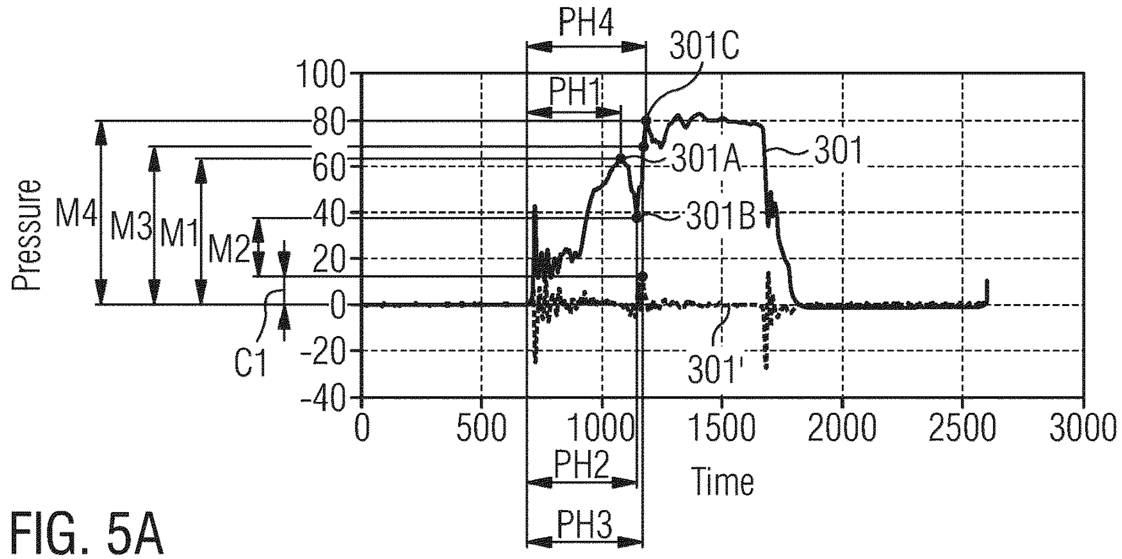
FIGS. 5A-5C shows examples of evaluation parameters for a resistance time profile.
Figure 5B:
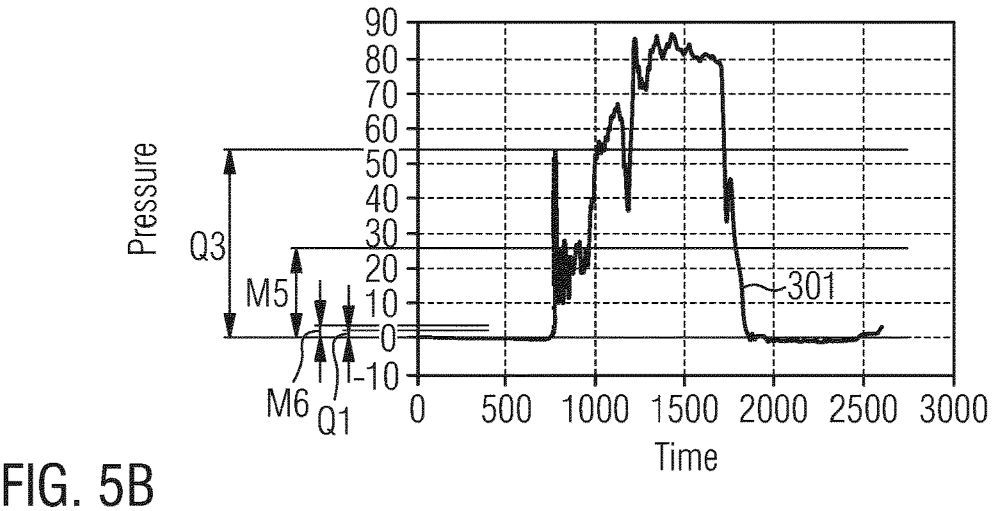
Figure 5C:
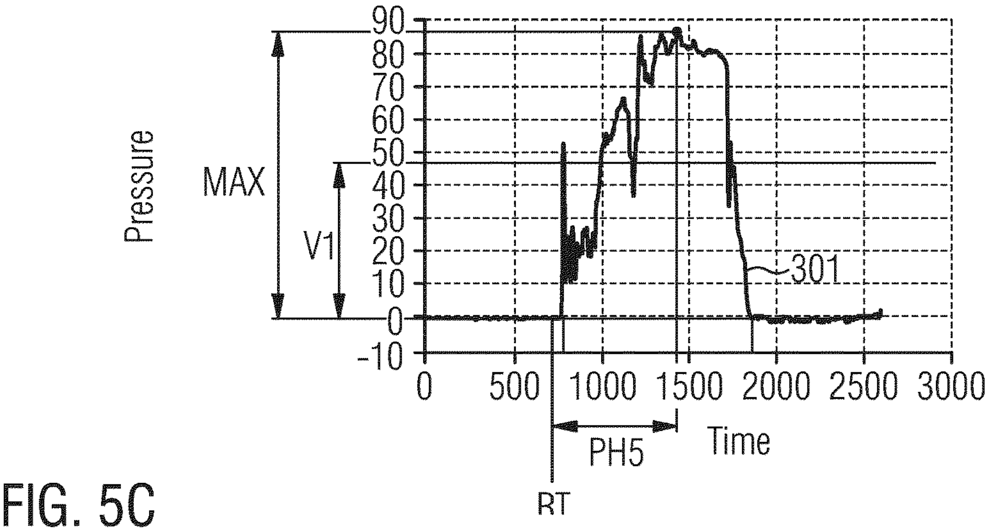

FIGS. 5A-5C are graphs of resistance time profiles 301 and indicate examples of predefined features and corresponding evaluation parameters that may be included in the set of input values of step 405. FIG. 5A indicates the first peak 301A and its phase value PH1, and the second peak 301B and its phase value PH2. Further, phase value PH3 is given by the timing of the maximum time derivative for the profile 301 or the intermediate portion IP (cf. FIGS. 2A-2B). In the lower part of FIG. 5A, signal 301' illustrates the absolute value of the time derivative as a function of time along the profile 301. FIG. 5A also includes a phase value PH4, which is given by a positive peak 301C after the maximum time derivative. The positive peak 301C has also been found to correlate with the condition of the cutting blade. It is currently believed that the undulating structure following upon the peak 301C is caused by a "hammer effect" in the hydraulic system when the cutting blade has penetrated the seal. The hammer effect, also known as hydraulic shock, is a pressure surge or wave caused when a fluid in motion is forced to stop or change direction suddenly. Thereby, the positive peak 301C is affected by the negative peak 301B and is thus also likely to be affected by the condition of the cutting blade. FIG. 5C shows another example of a phase value PH5, which is given by the time point of the maximum amplitude value within the profile 301.

It is to be understood that depending on the representation of the resistance time profile, step 402 may detect the predefined feature as, for example, a local peak, a minimum or maximum value, or a minimum or maximum time derivative.

If the profile 301 is highly structured, for example as shown in FIGS. 5A-5C, it may be challenging for step 403 to detect one or more of the peaks 301A-301C locally within the profile 301, for example within the intermediate portion IP. In some embodiments, such a peak may be detected by first processing the profile 301' for detection of the maximum time derivative and then processing the profile 301' for detection of the peak in relation to the time point of the maximum time derivative. It has been generally found that peaks 301A, 301B occur before and peak 301C occur after the maximum time derivative. In some embodiments, step 403 may thus search for one or more of the peaks 301A-301C within a time window set in relation to the timing of the maximum time derivative.

As indicated by dashed boxes in FIG. 4, the method may comprise one or more further steps 404B-404E for determining additional input values to be included in the set of input values, together with the phase value(s), for use by step 405. In some embodiments, the additional input values may comprise one or more magnitude values, one or more change values, one or more intra-variability values, one or more inter-variability values, or any combination thereof.

In some embodiments, the method 400 may include a step 404B that determines one or more magnitude values of the profile 301. The respective magnitude value represents an amount of cutting resistance given by the profile 301. As noted above, at least for some features of the profile 301, the magnitude may increase with increasing wear of the cutting blade. In some embodiments, step 404B determines the magnitude of the profile 301 at a selected time point relative to the predefined feature(s) detected by step 403. For example, as shown in FIG. 5A, magnitude value M1 represents cutting resistance at peak 301A, magnitude value M2 represents cutting resistance at peak 301B, magnitude value M3 represents cutting resistance at the time point of the maximum time derivative, and magnitude value M4 represents cutting resistance at peak 301C. The respective magnitude value M1-M4 may be given by an individual amplitude value (cutting resistance) in the profile 301 or by an average or median of amplitude values within a small time window around the respective feature. Further examples of magnitude values are shown in FIG. 5C, including magnitude values M5, M6 that represent the average and median, respectively, of the amplitude values in the profile 301, and magnitude values Q1, Q3 that represent the first quartile and the third quartile, respectively, of the amplitude values in the profile 301. In a variant, any one of the magnitude values M5, M6, Q1, Q3 may be calculated for the amplitude values within the intermediate portion (IP in FIGS. 2A-2B). Another example is shown in FIG. 5C, where the magnitude value MAX represents the maximum amplitude value in the profile 301. Other magnitude values, not shown on the drawings, include a sum of positive or negative values within the profile 301 or within a subset thereof (for example, IP), an impulse factor, or a crest factor. The impulse factor may represent the magnitude of a peak divided by the variability in the profile 301 (or IP), for example given as RMS. The crest factor may represent the maximum amplitude divided by the variability for the profile 301 (or IP). Numerous alternatives are conceivable. It may be noted that the magnitude value(s) need not be determined in the time domain but could be determined in the frequency domain. For example, one or more magnitude values may be given by the amplitude of at least one basis function that represents the profile 301, for example a harmonic frequency obtained by Fourier analysis of the profile 301, a wavelet obtained by wavelet analysis, or an Intrinsic Mode Function (IMF) obtained by Empirical Mode Decomposition (EMD) of the profile 301.

In some embodiments, the method 400 may include a step 404C that determines one or more change values for the profile 301. The respective change value represents a magnitude of the temporal change within the profile 301 (or IP, FIGS. 2A-2B). In some embodiments, step 404B determines a time derivative in the profile at a selected time point relative to the predefined feature(s) detected by step 403. For example, the change value may represent the magnitude of the maximum time derivative, as indicated by C1 in FIG. 5A, or the magnitude of a slope on either side of any of the peaks 301A-301C. Another example of a change value represents a sum of time derivatives within the profile 301 or within a subset thereof (for example, IP).

In some embodiments, the method 400 may include a step 404D that determines at least one intra-variability value, which represents the variability within profile 301 or within a subset thereof (for example, IP). The variability may be represented by any conventional variability measure, including but not limited to RMS (root mean square), variance, standard deviation, or any variant thereof. The intra-variability value may, at least in some implementations, correlate with the condition of the cutting blade. It may, for example, increase with increasing wear. In FIG. 5B, an example of the intra-variability is designated V1 and represents RMS of the amplitude values in the profile 301.

In some embodiments, the method 400 may include a step 404E that determines at least one inter-variability value, which represents the variability between a plurality of profiles 301 generated for different cutting cycles during the operation of the packaging machine 10. The variability may be represented by any conventional variability measure, including but not limited to RMS, variance, standard deviation, or any variant thereof. In some embodiments, the inter-variability value may represent variability in phase value, magnitude value, change value or intra-variability value. Generally, to improve processing efficiency, step 404E may calculate the inter-variability value for evaluation parameter values that have previously been generated by the method, for example by step 404A, or any one of the optional steps 404B-404D if implemented in the method 400. In a variant, step 404E may calculate the intra-variability value(s) by processing a time sequence of profiles 301.

Figure 3B:
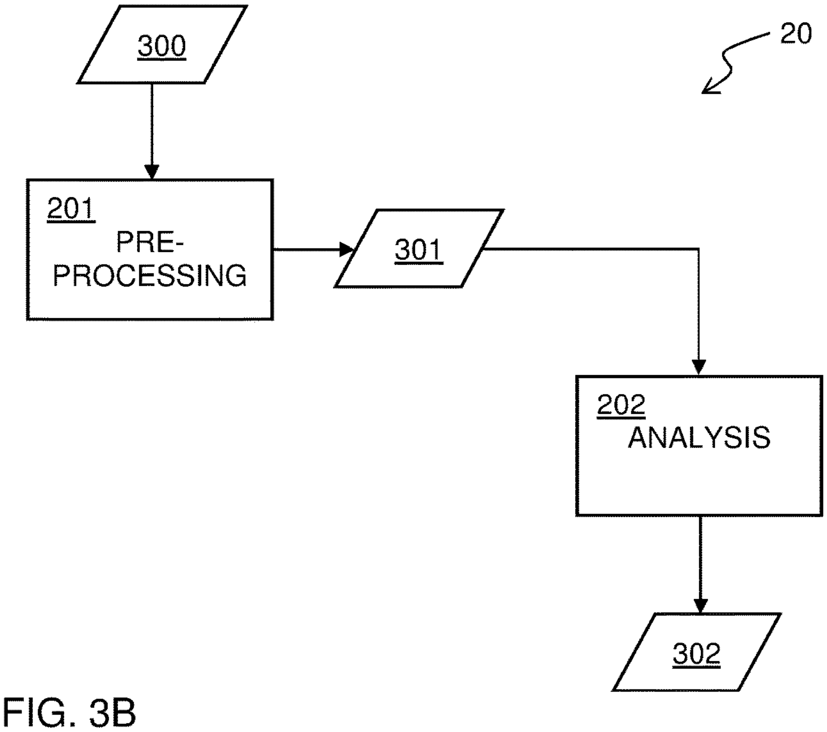

FIG. 3B is a block diagram of an example monitoring device 20 comprising logic that is configured to perform the method 400 in FIG. 4. In the illustrated example, the logic comprises a set of modules or units 201, 202. The respective module 201, 202 may be implemented by hardware or a combination of software and hardware. As described for FIG. 3A, the monitoring device 20 may be implemented on a software-controlled computing device. In FIG. 3B, a pre-processing module 201 is configured to perform steps 401-402. The module 201 is configured to operate on a signal 300, which is generated by the sensor 30 (FIGS. 1C, 3A) and comprises the time sequence of measurement values, and to output the resistance time profile 301. An analysis module 202 is configured to perform steps 403, 404A and 405, and optionally any one of steps 404B-404E. The module 202 is configured to process the profile 301 or a time sequence of profiles 301, generated by the module 201, for determining the condition of the cutting blade and to output a corresponding indicator 302, which is thus indicative of the current condition of the cutting blade.

Figure 3C:
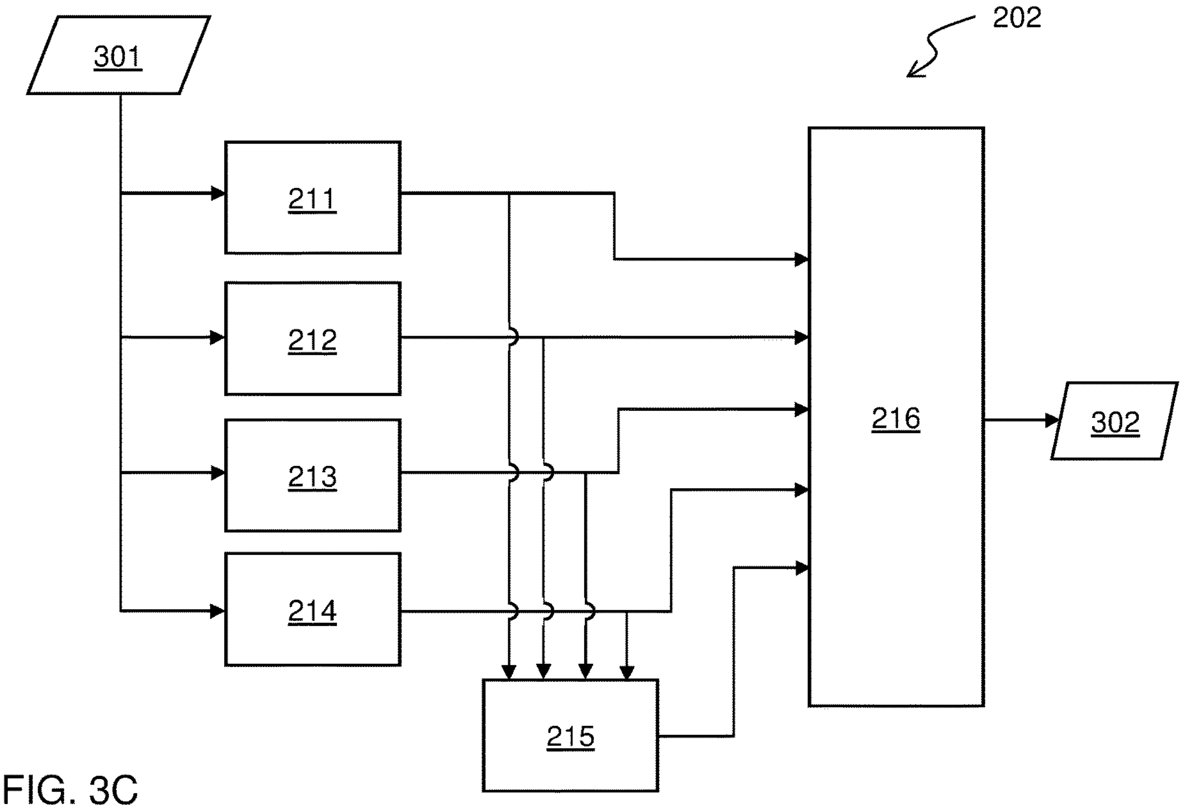

FIG. 3C is a block diagram of an example analysis module 202. The analysis module 202 comprises calculation sub-modules 211-215. By analogy with the method 400 in FIG. 4, sub-modules 212-215 are optional. Sub-module 211 is configured to perform steps 403 and 404A and will generate one or more phase values for the profile 301. Sub-module 212 is configured to perform steps 403 and 404B and will generate one or more magnitude values for the profile 301. Sub-module 213 is configured to perform steps 403 and 404C and will generate one or more change values for the profile 301. It may be noted that step 403 may differ between sub-modules 211-213 by detecting different predefined features. To the extent that two or more sub-modules 211-213 operate on the same predefined feature(s), such data may be shared among the sub-modules and/or generated by a dedicated sub-module (not shown). Sub-module 214 is configured to perform step 404D and will generate one or more intra-variability values for the profile 301. Sub-module 215 is configured to perform step 404E to generate one or more inter-variability values. Sub-module 215 may operate on the evaluation parameter values that are generated by at least one of the sub-modules 211-214 over time. The analysis module 202 further comprises an evaluation module 216, which is configured to perform step 405 and operates on the values generated by sub-modules 211-215 to generate and output the condition indicator 302.

Figure 6:
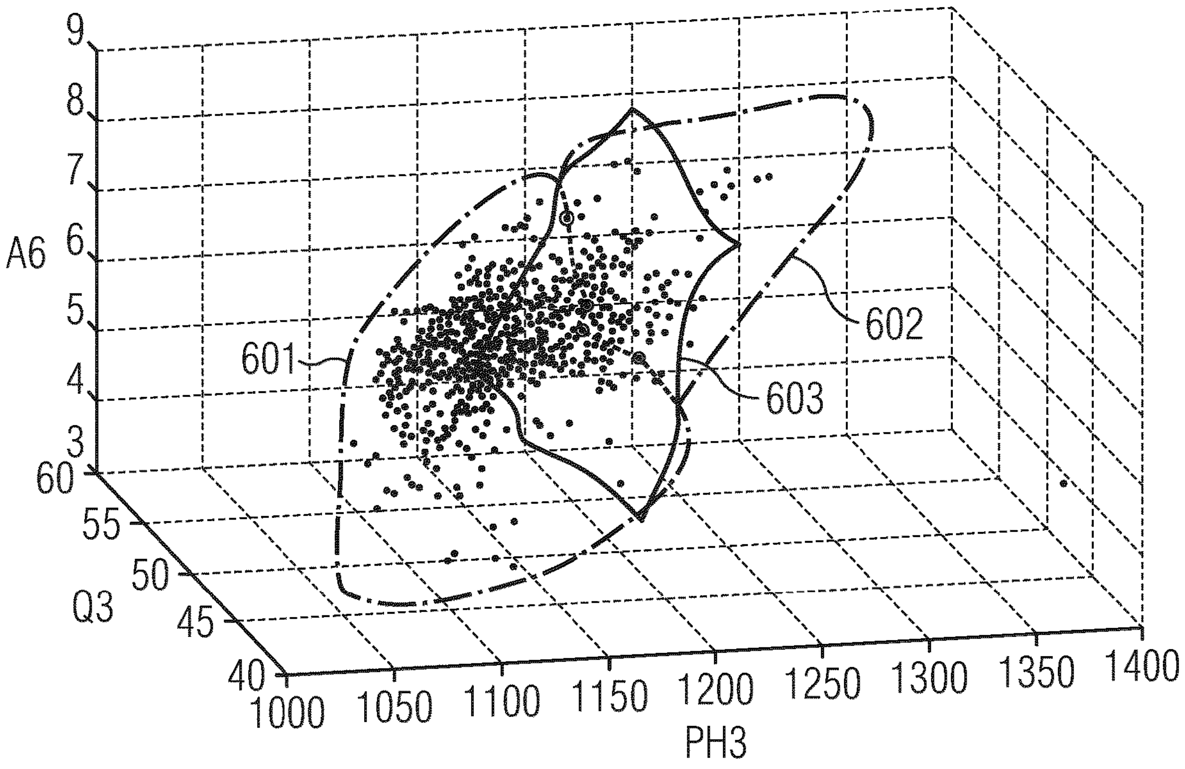
FIG. 6 is a graph of data points extracted from resistance time profiles for sharp and worn cutting blades, given by three example evaluation parameters and separated into two clusters by a threshold surface.

In some embodiments, the evaluation sub-module 216 comprises a rule-based algorithm for evaluating the set of input values. Such a rule-based algorithm may evaluate the respective input value in relation to a corresponding threshold value. If input values of a plurality of evaluation parameters are provided to the sub-module 216, for example as shown in FIG. 3C, the input values may be seen to span a multi-dimensional parameter space. Further, the corresponding threshold values may be seen to define one or more multi-dimensional surfaces that separate sub-spaces associated with different conditions of the cutting blade. In FIG. 6, each data point is given by three input values extracted from a respective profile. Each data point is associated with a known condition of the cutting blade: "acceptable" or "unacceptable". In the illustrated parameter space, the data points associated with an acceptable condition form a cluster in a first sub-space 601, and the data points associated with an unacceptable condition form a cluster in a second sub-space 602. As indicated, the sub-spaces 601, 602 are separated by a three-dimensional surface 603. The example in FIG. 6 shows that the condition of the cutting blade may be determined by setting the threshold values to define the surface 603. In FIG. 6, which is for the purpose of illustration only, the input values are given by evaluation parameters A6, Q3 and PH4, with Q3 and PH4 as defined hereinabove, and A6 being the amplitude of the sixth harmonic frequency of the profile 301.

In some embodiments, the evaluation sub-module 216 comprises a machine learning-based model, which has been trained to determine the condition of the cutting blade based on a feature vector comprising a plurality of input values. Any suitable machine learning-based model known in the art may be used, including but not limited to a neural network such as an artificial neural network (ANN) or a convolutional neural network (CNN), an ensemble learning method such as Random Forest, a support vector machine (SVM), or any combination thereof. It may be noted, however, that the input values may be pre-processed by the analysis module 212 before they are input to the machine learning-based model, for example by normalization or scaling, as is well known in the art.

While the example embodiments have been described with reference to determination of the condition of the cutting blade in terms of wear, the foregoing teachings may be readily modified, as understood by the person skilled in the art, for determination of another type of status of the cutting unit that includes the cutting blade, such as any other status of the cutting unit as mentioned or implied hereinabove. For example, modifications of the example embodiments may include a modified selection of predefined feature(s) to be detected in the resistance time profile (cf. step 403), a modified set of input values to be analyzed for determining the status (step 405), or a modified analysis of the set of input values such as by use of modified threshold values, modified training of the machine learning-based model, etc.

In the following, items are recited to summarize some aspects and embodiments as disclosed in the foregoing.

Item 1. A method of monitoring a status of a cutting unit in an apparatus for producing packages of liquid food, said apparatus comprising the cutting unit and being configured to vertically seal a web of packaging material in the form of a tube, fill the tube with liquid food, form transverse seals in the tube, and cut the transverse seals by a cutting blade in the cutting unit to sever food-containing packages from each other, said method comprising: obtaining (401) a time sequence of measurement values from a sensor arranged to measure cutting resistance for the cutting blade when actuated to cut a respective transverse seal; processing (402) the time sequence of measurement values to generate a resistance time profile; detecting (403) at least one predefined feature in the resistance time profile; determining (404A) a respective phase value for the at least one predefined feature within the resistance time profile; and determining (405) the status of the cutting unit as a function of a set of input values comprising the respective phase value.

Item 2. The method of item 1, wherein the time sequence of measurement values is obtained to represent hydraulic pressure in a hydraulic circuit for actuating the cutting blade to cut the transverse seals.

Item 3. The method of item 1 or 2, wherein the at least one predefined feature comprises one or more of: a peak (301A, 301B, 301C) in the resistance time profile (301), a minimum or maximum value of the resistance time profile (301), or a minimum or maximum time derivative in the resistance time profile (301).

Item 4. The method of item 3, wherein the peak (301A, 301B) corresponds to one of: the cutting blade (166*a*, 166*b*) entering into the respective transverse seal, or the cutting blade (166*a*, 166*b*) penetrating through the respective transverse seal.

Item 5. The method of item 2 or 3, wherein said detecting (403) comprises processing the resistance time profile (301) for detection of a time point of the maximum time derivative in the resistance time profile (301), and processing the resistance time profile (301) for detection of one or more of: a negative peak (301B) before the time point, a first positive peak (301A) before the time point and the negative peak (301B), or a second positive peak (301C) after the time point.

Item 6. The method of any preceding item, further comprising determining (404B) at least one magnitude value of the resistance time profile (301), wherein the at least one magnitude value is included in the set of input values.

Item 7. The method of item 6, wherein the at least one magnitude value comprises a magnitude of the resistance time profile at a selected time point relative to the at least one predefined feature.

Item 8. The method of item 6 or 7, wherein the at least one magnitude value comprises one or more of: an amplitude of the at least one predefined feature, an average or a median within at least a subset of the resistance time profile (301), a sum of positive or negative values within at least a subset of the resistance time profile (301), an impulse factor, a crest factor, an amplitude of at least one basis function that represents the resistance time profile (301).

Item 9. The method of any preceding item, further comprising determining (404C) at least one change value representing a magnitude of temporal change within the resistance time profile (301), wherein the at least one change value is included in the set of input values.

Item 10. The method of item 9, wherein the at least one change value comprises one or more of: a time derivative in the resistance time profile (301) at a selected time point relative to the at least one predefined feature, or a sum of time derivatives of at least a subset of the resistance time profile (301).

Item 11. The method of any preceding item, further comprising determining (404D) at least one intra-variability value representing a variability within at least a subset of the resistance time profile (301), wherein the at least one intra-variability value is included in the set of input values.

Item 12. The method of item 11, wherein the at least one intra-variability value comprises one or more of: standard deviation, variance, or RMS.

Item 13. The method of any preceding item, further comprising determining (404E) at least one inter-variability value representing a variability between a plurality of resistance time profiles (301), wherein the at least one inter-variability value is included in the set of input values.

Item 14. The method of item 13, wherein the at least one inter-variability value represents a variability, between a plurality of resistance time profiles (301), of one or more of: the respective phase value, the at least one magnitude value, the at least one change value or the at least one intra-variability value.

Item 15. The method of item 13 or 14, wherein the at least one inter-variability value comprises one or more of: standard deviation, variance, or RMS.

Item 16. The method of any preceding item, wherein said processing (402) comprises: processing the time sequence of measurement values to generate the resistance time profile (301) to represent measured cutting resistance as a function of time.

Item 17. The method of any preceding item, wherein said determining (405) the status comprises: comparing the set of input values to a corresponding set of threshold values.

Item 18. The method of any one of items 1-16, wherein said determining (405) the status comprises: providing the set of input values to a trained machine learning-model (216).

Item 19. A computer-readable medium comprising computer instructions which, when executed by a processor (22), cause the processor (22) to perform the method of any one of items 1-18.

Item 20. A monitoring device, comprising a signal interface (21) for connection to a sensor (30) which is arranged to measure and output a time sequence of measurement values that represent cutting resistance for a cutting blade (166*a*, 166*b*) in an apparatus (10) for producing packages (106) of liquid food while the cutting blade (166*a*, 166*b*) is actuated to cut a respective seal formed in a tube (104) filled with liquid food, and logic (201, 202) configured to control the monitoring device to perform the method of any one of items 1-18.

Item 21. An apparatus for producing packages (106) of liquid food, said apparatus comprising a cutting unit (165*a*, 165*b*) and being configured to vertically seal a web of packaging material in the form of a tube (104), fill the tube (104) with liquid food, form transverse seals in the tube (104), and cut the transverse seals with a cutting blade (166_a_, 166_b_) in the cutting unit (165_a_, 165_b_) to sever food-containing packages (106) from each other, said apparatus further comprising: a sensor (30) which is arranged to measure and output a time sequence of measurement values that represent cutting resistance for the cutting blade (166_a_, 166_b_) when actuated to cut a respective transverse seal; and a monitoring device (20) according to item 20.

The invention claimed is:

1. A method of monitoring a status of a cutting unit in an apparatus for producing packages of liquid food, said apparatus comprising the cutting unit and being configured to vertically seal a web of packaging material in the form of a tube, fill the tube with liquid food, form transverse seals in the tube, and cut the transverse seals by a cutting blade in the cutting unit to sever food-containing packages from each other, said method comprising:

- measuring, with a sensor, measurement values indicative of a cutting resistance of the cutting blade during a cut;
- obtaining, from the sensor, a time sequence of the measurement values;
- generating a resistance time profile of the cut based on the time sequence of measurement values;
- detecting at least one predefined feature in the resistance time profile;
- determining a phase value for the at least one predefined feature within the resistance time profile, wherein the phase value is a time of occurrence of the at least one predefined feature on the resistance time profile relative to a known reference time point on the resistance time profile;
- determining the status of the cutting unit based at least in part on the phase value;
- generating, based on the status of the cutting unit, output data indicating the status of the cutting blade;
- transmitting the output data to a module of the apparatus, wherein the output data causes the module to display the status of the cutting unit.

2. The method of claim 1, wherein the time sequence of measurement values is obtained to represent hydraulic pressure in a hydraulic circuit for actuating the cutting blade to cut the transverse seals.

3. The method of claim 2, wherein said detecting comprises processing the resistance time profile for detection of a time point of a maximum time derivative in the resistance time profile, and processing the resistance time profile for detection of a peak selected from the group consisting of a negative peak before the time point, a first positive peak before the time point and the negative peak, and a second positive peak after the time point.

4. The method of claim 1, wherein the at least one predefined feature is selected from the group consisting of a peak in the resistance time profile, a minimum or maximum value of the resistance time profile, and a minimum or maximum time derivative in the resistance time profile.

5. The method of claim 4, wherein the peak corresponds to the cutting blade entering into a transverse seal or the cutting blade penetrating through the transverse seal.

6. The method of claim 1, wherein the status of the cutting unit is determined based at least in part on a set of input values comprising the phase value.

7. The method of claim 6, further comprising determining at least one magnitude value of the resistance time profile, wherein the at least one magnitude value is included in the set of input values.

8. The method of claim 7, wherein the at least one magnitude value comprises a magnitude of the resistance time profile at a selected time point relative to the at least one predefined feature.

9. The method of claim 6, further comprising determining at least one change value representing a magnitude of temporal change within the resistance time profile, wherein the at least one change value is included in the set of input values.

10. The method of claim 9, wherein the at least one change value is selected from the group consisting of a time derivative in the resistance time profile at a selected time point relative to the at least one predefined feature, and a sum of time derivatives of at least a subset of the resistance time profile.

11. The method of claim 6, further comprising determining at least one intra-variability value representing a variability within at least a subset of the resistance time profile, wherein the at least one intra-variability value is included in the set of input values.

12. The method of claim 6, further comprising determining at least one inter-variability value representing a variability between a plurality of resistance time profiles, wherein the at least one inter-variability value is included in the set of input values.

13. The method of claim 12, wherein the at least one inter-variability value represents a variability, between a plurality of resistance time profiles selected from the group consisting of the phase value, at least one magnitude value, at least one change value or at least one intra-variability value.

14. A computer-readable medium comprising computer instructions which, when executed by a processor, cause the processor to perform the method of claim 1.

15. The method of claim 1, wherein the known reference time point is a time of generating a trigger signal for operating the cutting blade.

16. A monitoring device, comprising a signal interface for connection to a sensor which is arranged to measure and output a time sequence of measurement values indicative of a cutting resistance for a cutting blade in an apparatus for producing packages of liquid food during a cut performed by the cutting blade to cut a seal formed in a tube filled with liquid food, and logic configured to control the monitoring device to cause the monitoring device to:

- obtain, from the sensor, the time sequence of the measurement values;
- generate a resistance time profile of the cut based on the time sequence of measurement values;
- detect at least one predefined feature in the resistance time profile;
- determine a phase value for the at least one predefined feature within the resistance time profile, wherein the phase value is a time of occurrence of the at least one predefined feature on the resistance time profile relative to a known reference time point on the resistance time profile;
- determine a status of the cutting blade based at least in part on the phase value;
- generate, based on the status of the cutting blade, output data indicating the status of the cutting blade;
- transmit the output data to a module of the apparatus, wherein the output data causes the module to display the status of the cutting blade.

17. An apparatus for producing packages of liquid food, said apparatus comprising a cutting unit and being configured to vertically seal a web of packaging material in the form of a tube, fill the tube with liquid food, form transverse seals in the tube, and cut the transverse seals with a cutting blade in the cutting unit to sever food-containing packages from each other, said apparatus further comprising:

a sensor which is arranged to measure and output a time sequence of measurement values that represent cutting resistance for the cutting blade when actuated to cut a transverse seal; and a monitoring device configured to:

obtain, from the sensor, the time sequence of the measurement values;

generate a resistance time profile of the cut based on the time sequence of measurement values;

detect at least one predefined feature in the resistance time profile;

determine a phase value for the at least one predefined feature within the resistance time profile, wherein the phase value is a time of occurrence of the at least one predefined feature on the resistance time profile relative to a known reference time point on the resistance time profile;

determine a status of the cutting unit based at least in part on the phase value;

generate, based on the status of the cutting unit, output data indicating the status of the cutting blade;

transmit the output data to a module of the apparatus, wherein the output data causes the module to display the status of the cutting unit.

* * * * *